(12) United States Patent
Bregman et al.

(10) Patent No.: US 11,507,393 B2
(45) Date of Patent: Nov. 22, 2022

(54) FACILITATING AUTOMATIC DEPLOYMENT AND CONFIGURATION OF COMPUTING ENVIRONMENTS

(71) Applicant: Red Hat, Inc., Raleigh, NC (US)

(72) Inventors: Arie Bregman, Gan Yavne (IL); Avraham Talmor, Leziyyon (IL)

(73) Assignee: RED HAT, INC., Raleigh, NC (US)

( * ) Notice: Subject to any disclaimer, the term of this patent is extended or adjusted under 35 U.S.C. 154(b) by 135 days.

(21) Appl. No.: 17/022,376

(22) Filed: Sep. 16, 2020

(65) Prior Publication Data
US 2022/0083350 A1 Mar. 17, 2022

(51) Int. Cl.
G06F 9/44 (2018.01)
G06F 9/445 (2018.01)

(52) U.S. Cl.
CPC .................. G06F 9/44505 (2013.01)

(58) Field of Classification Search
CPC .................. G06F 9/44; G06F 1/32
See application file for complete search history.

(56) References Cited

U.S. PATENT DOCUMENTS

| | | | |
|---|---|---|---|
| 6,334,178 B1* | 12/2001 | Cannon | G06F 9/44505 707/999.201 |
| 8,326,870 B2 | 12/2012 | Rizzolo et al. | |
| 9,411,570 B2 | 8/2016 | Dehaan | |
| 9,892,021 B2 | 2/2018 | Coyle et al. | |
| 9,898,270 B2 | 2/2018 | Demiroski et al. | |
| 10,680,901 B2 | 6/2020 | Freund et al. | |
| 2004/0015791 A1* | 1/2004 | Smith | G01R 31/318385 716/106 |
| 2005/0065993 A1* | 3/2005 | Honda | H04L 67/40 709/200 |
| 2009/0043993 A1* | 2/2009 | Ford | G06F 11/364 712/216 |
| 2014/0244810 A1* | 8/2014 | Chen | H04L 41/12 709/221 |
| 2019/0018759 A1 | 1/2019 | Keinan | |

OTHER PUBLICATIONS

"Open mHealth Sample Data Generator," GitHub, Inc., 2020, https://github.com/openmhealth/sample-data-generator.

(Continued)

*Primary Examiner* — Keshab R Pandey
(74) *Attorney, Agent, or Firm* — Kilpatrick Townsend & Stockton LLP

(57) ABSTRACT

Computing environments can be automatically deployed and configured. For example, a computing system can receive a configuration dataset and identify a plurality of variables in the configuration dataset that have values that are undefined in the configuration dataset. The computing system can generate synthesized values for the plurality of variables. The computing system can generate an updated configuration dataset based on the synthesized values in which the plurality of variables are replaced with the synthesized values. The computing system can provide the updated configuration dataset to a configuration manager for causing the configuration manager to configure a plurality of servers in a distributed computing environment automatically based on the updated configuration dataset.

20 Claims, 3 Drawing Sheets

(56) References Cited

OTHER PUBLICATIONS

Saleem, H. et al., "Imposing Software Traceability and Configuration Management for Change Tolerance in Software Production," Department of Computer Science, UBIT, University of Karachi, Pakistan; College of Computer Science & Information Systems, Institute of Business Management, IoBM, Pakistan, Jan. 2019, https://www.researchgate.net/profile/Hussain_Saleem/publication/331111799_Imposing_Software_Traceability_and_Configuration_Management_for_Change_Tolerance_in_Software_Production/links/5c6654c1a6fdccb608c3cb15/Imposing-Software-Traceability-and-Configuration-Management-for-Change-Tolerance-in-Software-Production.pdf.

* cited by examiner

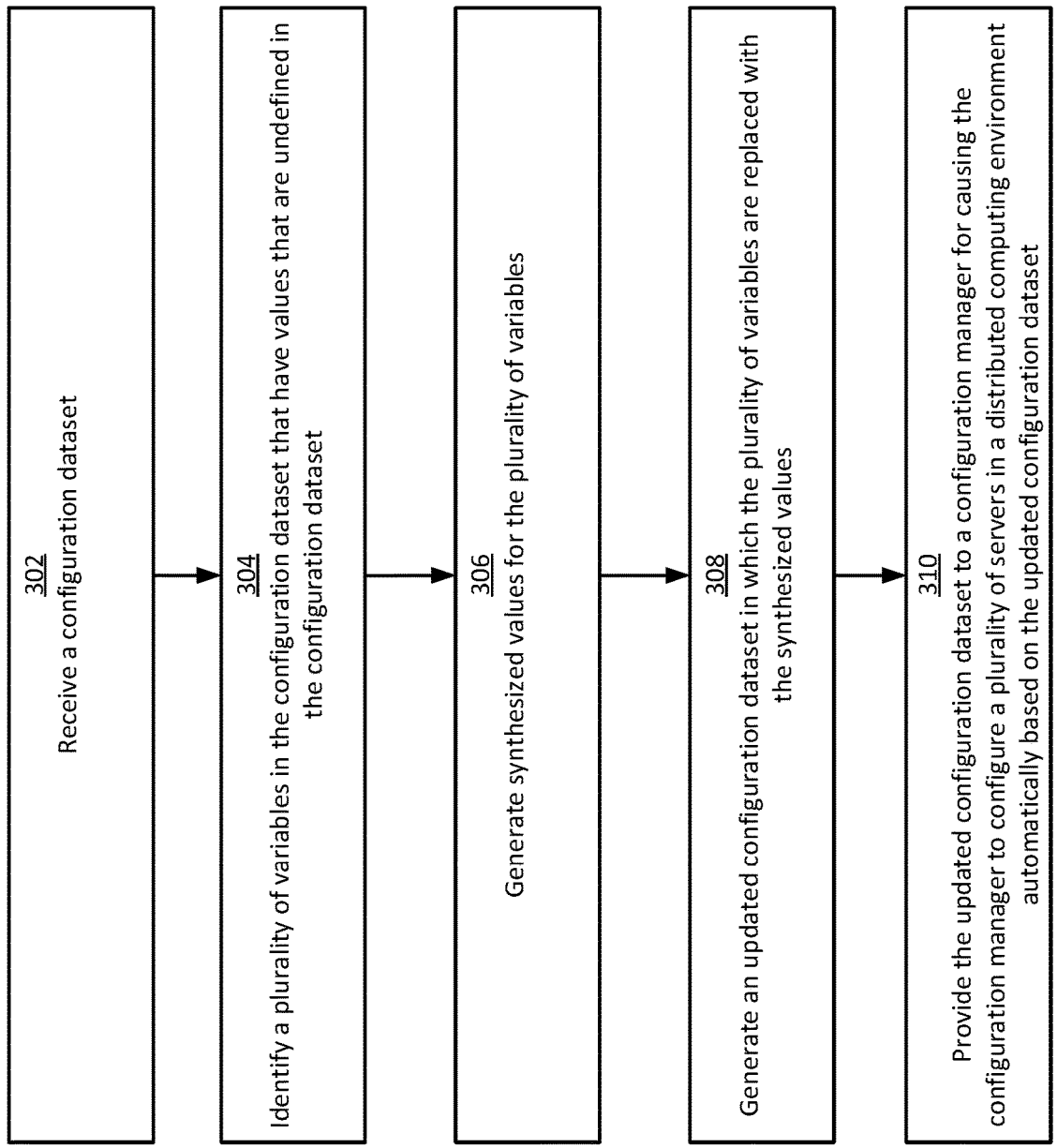

FACILITATING AUTOMATIC DEPLOYMENT AND CONFIGURATION OF COMPUTING ENVIRONMENTS

TECHNICAL FIELD

The present disclosure relates generally to configuring computing environments. More specifically, but not by way of limitation, this disclosure relates to facilitating automatic deployment and configuration of computing environments.

BACKGROUND

Computing systems have system configurations defined by configuration files. The configuration files can specify software applications, server processes, operating system parameters, or other configurable parameters for the computing systems. A configuration manager can configure, provision, and manage computing systems using configuration files. One example of a configuration manager is Ansible. Ansible is software that can run on a control computing system and use playbooks to perform operations on managed computing systems (e.g., servers). Playbooks are configuration files in YAML format that can declare desired configurations for the managed computing systems. Ansible can ingest the playbooks and responsively perform steps to configure the managed computing systems as specified in the playbooks. Other configuration managers, such as Chef, Puppet, and Salt, can perform similar functionality to Ansible.

BRIEF DESCRIPTION OF THE DRAWINGS

FIG. 3 is a flow chart of an example of a process for facilitating automatic deployment and configuration of computing environments according to some aspects of the present disclosure.

DETAILED DESCRIPTION

Figure 1:
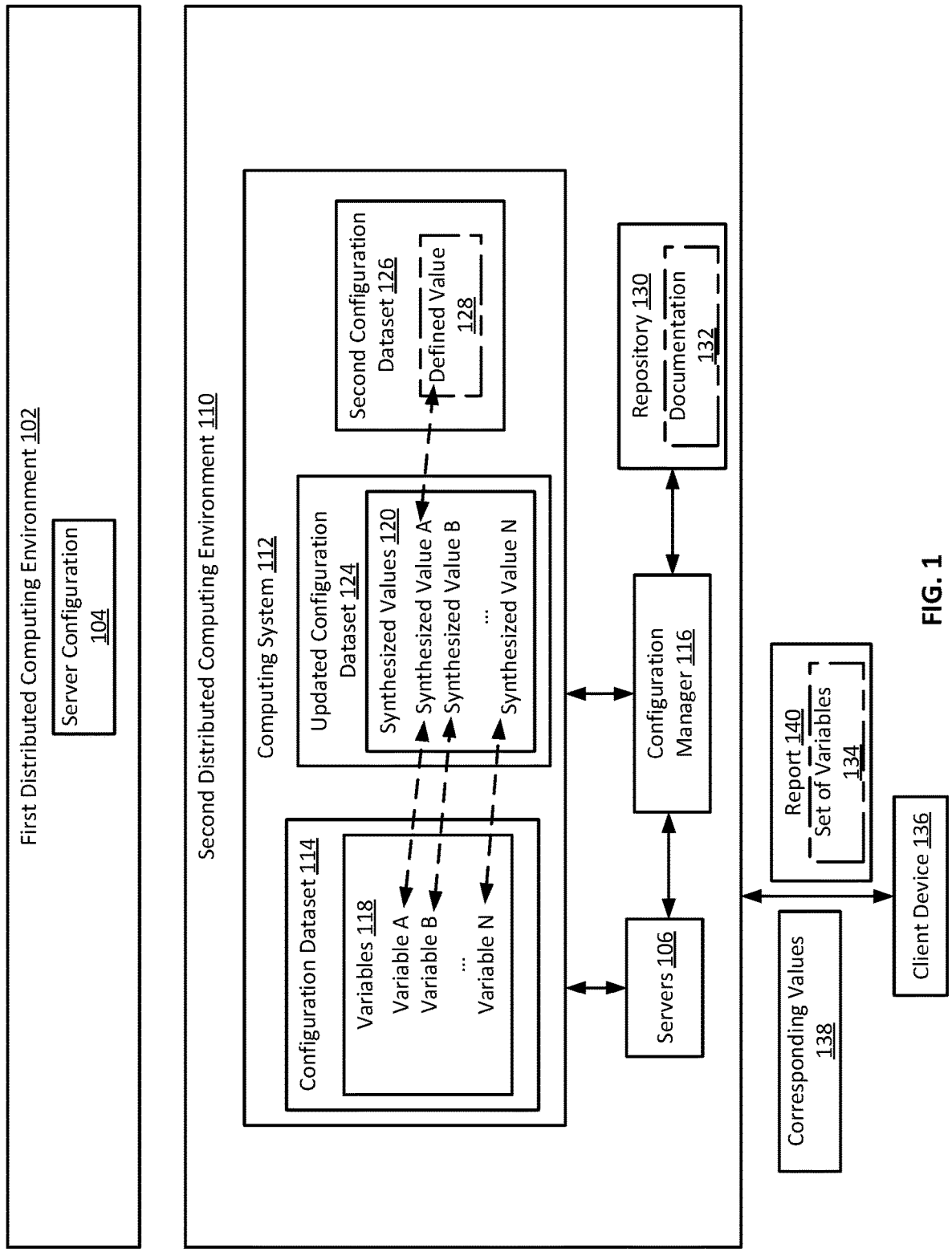
FIG. 1 is a block diagram of an example of a system for facilitating automatic deployment and configuration of computing environments according to some aspects of the present disclosure.

Production environments are computing environments in which software and other products are put into operation for their intended uses by end users. Although software is often rigorously tested prior to its deployment in a production environment, bugs do arise. To determine a root cause of a bug in a production environment, a developer can deploy a debugging environment. The debugging environment can be a computing environment that is separate from the production environment and configured to serve as a proxy for the production environment. Such debugging environments allow a developer to run various tests (e.g., unit tests, integration tests, etc.) on the software in an environment that approximates and has similar characteristics to the production environment, without affecting the actual production environment or the production version of the software.

To quickly and easily deploy the debugging environment, the developer may use a configuration manager like Ansible. In particular, the developer may provide a configuration dataset in the form of an Ansible playbook as input to Ansible. Ansible can receive the playbook and attempt to automatically deploy the debugging environment in accordance with the playbook. But such playbooks can include hundreds or thousands of variables that dictate how Ansible configures a computing environment. And it is often the case that many of the variables in the playbook have undefined values because data from the production environment used to populate values for variables is not available in the debugging environment. Variables with undefined values may be referred to herein as undefined variables. The presence of undefined variables in the playbook can yield errors that prevent Ansible from deploying a computing environment. In such circumstances, the developer may have to manually enter values for these variables into the playbook, which can be time consuming, tedious, complex, and error prone, before the developer is able to successfully deploy the debugging environment. Similar problems can also arise outside the debugging context, when attempting to deploy other types of computing environments using an automated configuration manager like Ansible that relies on a configuration dataset that may be incomplete.

Some examples of the present disclosure overcome one or more of the abovementioned problems by automatically generating some or all of the required variable values for a configuration dataset, such as an Ansible playbook. In one example, the computing system can receive a configuration dataset usable by a configuration manager (e.g., Ansible) to automatically configure servers in a distributed computing environment. The configuration dataset can specify configurations for system packages, operating system settings, and other components of the servers. The computing system can identify variables in the configuration dataset that have undefined values. The computing system can generate at least one synthesized value for each of the identified variables based on a type of the variable, contextual information surrounding the variable, and other available information for the variable. The computing system can replace the identified variables with the synthesized values in the configuration dataset to create an updated configuration dataset. The populated variable values can prevent the configuration manager from encountering an error while using the updated configuration dataset. The computing system can then provide the updated configuration dataset to the configuration manager to cause the configuration manager to automatically provision (e.g., deploy and configure) the servers based on the updated configuration dataset.

While the above synthesis process works well for most types of variables in a typical configuration dataset, some variables may not be well suited for automatic value synthesis. So, certain variables may be flagged (e.g., by a user or by default) to be skipped during the automatic synthesis process. For example, the computing system may not generate synthesized values for dynamic variables, which are variables having values that are determined on-the-fly during a configuration process or during runtime. The computing system may not be able to access the source of the dynamic variables, so the computing system may not be able to determine values for the dynamic variables that would allow the configuration manager to use the configuration dataset without encountering an error. Instead, the computing system can allow a user to manually input values for these undefined variables. In some examples, the user may be notified each time the computing system determines there is an undefined variable for which the computing system is not to generate a synthesized value, so that the user can manually input a value for the undefined variable on-the-fly as the synthesis process is progressing through the configuration dataset. Alternatively, the computing system may notify the user at the end of the synthesis process of an identified set of variables with undefined values that were skipped by the computing system, so that the user can manually enter values for those variables at that point in time.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for facilitating automatic deployment and configuration of computing environments according to some aspects of the present disclosure. The system can include a first distributed computing environment 102, a second distributed computing environment 110, and a client device 136 capable of communicating with the second distributed computing environment 110. Examples of the first distributed computing environment 102 and the second distributed computing environment 110 can be cloud computing environments, data grids, computing clusters, or any combination of these. A cloud computing environment has a shared pool of configurable resources (e.g., storage and computing power) that are accessible on demand to users. A data grid can be a set of computing devices that work together over a network to perform computing operations. Each computing device of the data grid may run different operating systems and have different hardware. A computing cluster can be a set of computing devices, which may have the same hardware and operating systems, in communication over a local area network (LAN) that work together to perform computing operations.

In some examples, the first distributed computing environment 102 can be a production environment in which end users can interact with a piece of software. A configuration manager using a configuration dataset can configure servers in the first distributed computing environment 102 to a specified server configuration 104. The configuration dataset can specify how to configure operating systems, system packages, network components, or a combination of these to achieve the server configuration 104.

The piece of software running in the first distributed computing environment 102 may have a bug and run improperly. A developer may want to determine a cause of the bug in the first distributed computing environment 102. To do so, the developer may wish to deploy a server configuration that is similar to the server configuration 104 in a debugging environment to identify and resolve the problem. An example of the debugging environment can a group of servers 106 in the second distributed computing environment 110.

To assist with deploying the servers 106, the second distributed computing environment 110 can include a computing system 112 (e.g., a server, laptop computer, or desktop computer). The computing system 112 can receive a configuration dataset 114. The computing system 112 can receive the configuration dataset 114 from any suitable source, such as the first distributed computing environment 102 or a repository on the Internet. The configuration dataset 114 may be configured to generate a server configuration that is similar to the server configuration 104, so that the servers 106 can mimic the first distributed computing environment 102. The configuration dataset 114 can be stored in any number of files, such as any number of text files in any suitable format such as YAML, JSON, and XML. Examples of the configuration dataset 114 include an Ansible playbook, a Chef cookbook, and a Salt state file. In some examples, the configuration dataset 114 may be automatically generated based on the server configuration 104.

After receiving the configuration dataset 114, the computing system 112 can perform one or more pre-processing operations in relation to the configuration dataset 114 to make the configuration dataset 114 more suitable for use with a configuration manager 116. As used herein, a configuration manager is software running in a distributed computing environment for provisioning one or more servers based on a configuration dataset. Examples of a configuration manager can include Ansible, Chef, Puppet, and Salt.

As noted above, the computing system 112 can perform one or more pre-processing operations with respect to the configuration dataset 114 prior to the configuration dataset 114 being input to the configuration manager 116. One example of such pre-processing operations can include filling in (e.g., populating) variable values. More specifically, the configuration dataset 114 can include variables with undefined values that can be populated by the computing system 112 prior to the configuration manager 116 using the configuration dataset 114. The variables may have undefined values because a data file in the first distributed computing environment 102 containing the values for the variables may not be available in the second distributed computing environment 110. In such examples, the computing system 112 can identify the variables 118 in the configuration dataset 114 that have values that are undefined in the configuration dataset 114.

At least some of the variables 118 can be configured to have static values. Static values can remain the same as they are used by the configuration manager 116. Examples of static values include a string, a number, a data file, and an assemblage of variables (e.g., lookup($current_directory+ $user)). In some examples, at least some of the variables 118 can be configured to have dynamic values. Dynamic values can be values that change over time, such as during a configuration process or at runtime. For example, dynamic values may periodically requested from a remote application programming interface (API) and updated over time accordingly.

In some examples, the computing system 112 can automatically generate synthesized values 120 for the variables 118. To generate the synthesized values 120, the computing system 112 can determine a respective type of each variable of the variables 118. For example, the respective type can be a string, character, integer, list, array, Boolean, or floating point number. The computing system 112 can generate synthesized values 120 for the variables 118 based on the respective type. At least one synthesized value can be generated for the variables 118 based on the respective type. As one particular example, the computing system 112 can determine Variable A in the variables 118 is an integer and the computing system 112 can generate a synthesized value of "2" for Variable A.

In some examples, the computing system 112 can determine the respective type of the variable is a list or an array. The computing system 112 can generate at least two synthetized values for the variable in response to determining the respective type of the variable is a list or an array. As one particular example, the computing system 112 can determine Variable B is a list. The computing system 112 can generate a synthesized list of "2, 4, 6" for Variable B.

In some examples, the computing system 112 can identify respective contextual information associated with each variable in the configuration dataset 114. The contextual information may be syntax associated with the variable. For example, the syntax associated with Variable A can be "package: {{Variable A}}". The computing system 112 can determine Variable A is a package based on the syntax and generate synthesized values 120 including package names based on the respective contextual information.

Additionally or alternatively, the contextual information may be other configuration datasets. For example, the computing system 112 can determine a relationship between the configuration dataset 114 and a second configuration dataset 126. An example of such a relationship may be that both configuration datasets 114, 126 are configured to deploy a debugging environment having similar characteristics to one another. Another example of a relationship may be that both configuration datasets 114, 126 include a same variable type. Based on the relationship between the configuration datasets 114, 126, the computing system 112 can generate a synthesized value for a variable based on a defined value 128 for the variable in a second configuration dataset 126. As one particular example, the second configuration dataset 126 can analyze the second configuration dataset 126 to determine that it has a defined value 128 of "2" for Variable A. So, the computing system 112 can generate the synthesized value of "2" for Variable A in the synthesized values 120.

Additionally or alternatively, the computing system 112 can generate a synthesized value for a variable based on a description of the variable in documentation 132. Examples of the documentation 132 can be a readme file or help documentation 132 associated with the configuration manager 116. The documentation 132 may be stored in a repository 130, in a folder, on a website, or elsewhere. The description of the variable can include syntax information, default values, a type of the variable, and other information. As one particular example, the computing system 112 can generate a value of "package.img" for Variable B based the documentation 132 specifying Variable B as a package variable.

In some examples, the computing system 112 can replace the variables 118 with the synthesized values 120 in the configuration dataset 114 to create an updated configuration dataset 124. Each synthesized value (e.g., Synthesized Value A, Synthesized Value B, ..., Synthesized Value N) of the synthesized values 120 can replace a variable (e.g., Variable A, Variable B, ..., Variable N, respectively) in the variables 118. The computing system 112 can provide the updated configuration dataset 124 as input to the configuration manager 116 for causing the configuration manager 116 to configure the servers 106 in the second distributed computing environment 110 based on the updated configuration dataset 124. Configuring the servers 106 in the second distributed computing environment 110 based on the updated configuration dataset 124 can allow a developer to debug a problem that arose in the first distributed computing environment 102.

In some examples, the computing system 112 can identify a set of variables 134 in the configuration dataset 114 that have undefined values in the configuration dataset 114 and for which the computing system 112 is not to generate corresponding synthesized values when creating the updated configuration dataset 124. An example of the set of variables 134 may be dynamic variables. The computing system 112 can notify a client device 136 of the set of variables 134 to enable a user of the client device 136 to manually input corresponding values 138 for the set of variables 134 into the updated configuration dataset 124. The computing system 112 can communicate with the client device 136 over a network, such as a LAN, WAN, or the Internet. In some examples, the computing system 112 may notify the client device 136 after the computing system 112 has completed analyzing the configuration dataset 114 and prior to the updated configuration dataset 124 being provided to the configuration manager 116. Alternatively, the computing system 112 may notify the client device 136 on-the-fly as the computing system 112 identifies a variable of the set of variables 134 for which the computing system 112 is not to generate a corresponding synthesized value. The user can respond to each notification with corresponding values 138 for the variable.

In some examples, the computing system 112 can generate a report 140 indicating the set of variables 134 after creating the updated configuration dataset 124. The computing system 112 can output the report 140 to the client device 136. The report 140 may indicate a number or percentage of the variables 118 for which the computing system 112 did not generate synthesized values 120. For example, the report 140 can indicate the computing system 112 did not generate synthesized values 120 for 20% of the variables 118.

After generating the updated configuration dataset 124, the computing system 112 can provide the updated configuration dataset 124 to the configuration manager 116. The configuration manager 116 may then automatically deploy the servers 106 based on the updated configuration dataset, as noted above. Because the updated configuration dataset 124 has been populated with variable values, the configuration manager 116 may be able to properly deploy the servers 106 without encountering errors.

While the example shown in FIG. 1 depicts a specific number and arrangement of components for simplicity, other examples may include more components, fewer components, different components, or a different arrangement of the components shown in FIG. 1. For example, the configuration manager 116 may be part of or remote from the computing system 112.

Figure 2:
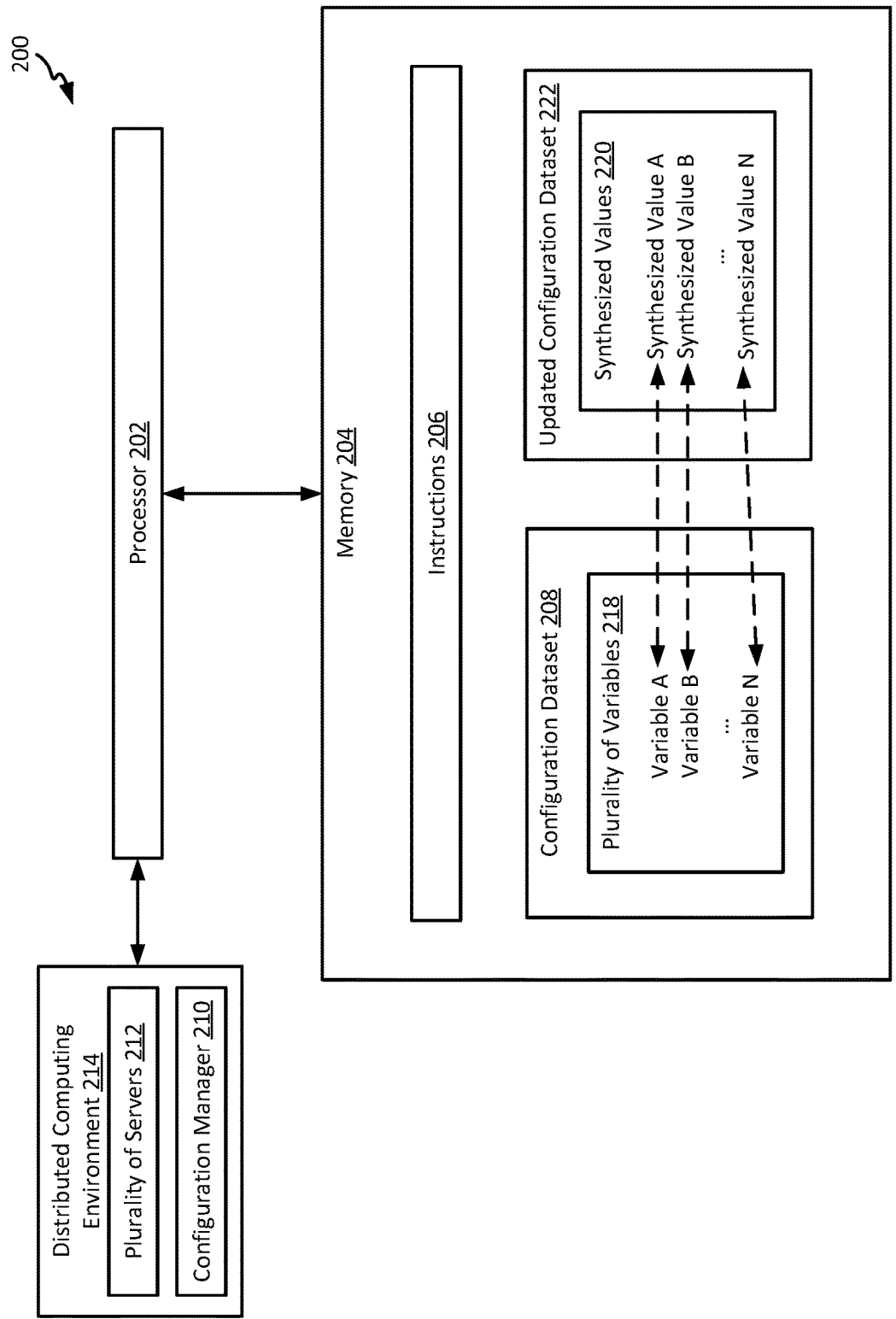
FIG. 2 is a block diagram of another example of a system for facilitating automatic deployment and configuration of computing environments according to some aspects of the present disclosure.

FIG. 2 is a block diagram of another example of a system 200 for facilitating automatic deployment and configuration of computing environments according to some aspects of the present disclosure. The system 200 includes a processor 202 communicatively coupled with a memory 204. In some examples, the processor 202 and the memory 204 can be part of a system, such as the computing system 112 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute instructions 206 to perform various operations. For example, the processor 202 can receive a configuration dataset 208. The processor 202 can identify a plurality of variables 218 in the configuration dataset 208 that have values that are undefined in the configuration dataset 208. The processor 202 can then generate synthesized values 220 for the plurality of variables 218.

In some examples, the processor 202 may determine a respective type for each variable in the plurality of variables 218 to generate the synthesized values 220. Additionally or alternatively, the processor 202 can use contextual information to generate the synthesized values 220. The processor 202 can use any number and combination of techniques to generate the synthesized values 220.

The processor 202 can generate an updated configuration dataset 222 in which the plurality of variables 218 are replaced with the synthesized values 220. In some examples, the processor 202 can replace each variable 218 with its corresponding synthesized value on-the-fly as the synthesized value is generated (e.g., one-by-one replacement). In other examples, the processor 202 may generate some or all of the synthesized values up front and do a bulk replacement later on.

Having generated the updated configuration dataset 222, the processor 202 can provide the updated configuration dataset 222 to a configuration manager 210 for causing the configuration manager 210 to configure a plurality of servers 212 in a distributed computing environment 214 automatically based on the updated configuration dataset 222. The configuration manager 210 may communicate with an API in the distributed computing environment 214 to deploy and configure the plurality of servers 212. Additionally or alternatively, the configuration manager 210 may communicate with software in the distributed computing environment 214 to deploy and configure the plurality of servers 212.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 receives a configuration dataset 208. The configuration dataset 208 can specify a configuration for a plurality of servers in a distributed computing environment. The configuration dataset 208 may be automatically generated based on a configuration in a different distributed computing environment.

In block 304, the processor identifies a plurality of variables 218 in the configuration dataset 208 that have values that are undefined in the configuration dataset 208. The plurality of variables 218 may have static values, dynamic values, or both. The plurality of variables 218 may be undefined because data from the production environment used to populate values for the plurality of variables 218 is not available in the debugging environment.

In block 306, the processor 202 generates synthesized values 220 for the plurality of variables 218. The processor 202 can generate the synthesized values 220 for each variable based on a respective type of the variable, respective contextual information associated with the variable, a defined value for the variable in a second configuration dataset, documentation associated with a configuration manager 210, or any combination of these. In some examples, the processor 202 can generate at least two synthesized values 220 for the variable. For example, the processor 202 can generate at least two synthesized values 220 in response to determining that the respective type of the variable is a list or an array.

In block 308, the processor 202 generates an updated configuration dataset 222 in which the plurality of variables 218 are replaced with the synthesized values 220. For example, the processor 202 can replace the plurality of variables 218 with the synthesized values 220 in the configuration dataset 208 to create the updated configuration dataset 222. In other examples, the updated configuration dataset 222 can be separate from the configuration dataset 222. For instance, the processor 202 can generate the updated configuration dataset 222 by making a copy of the configuration dataset 222 and replacing the plurality of variables 218 in the copy with the synthesized values 220. Either way, populating the variable values can prevent the configuration manager 210 from encountering an error when using the updated configuration dataset 222.

In block 310, the processor 202 provides the updated configuration dataset 222 to the configuration manager 210 for causing the configuration manager 210 to configure a plurality of servers 212 in a distributed computing environment 214 automatically based on the updated configuration dataset 222. In some examples, the distributed computing environment 214 may be a debugging environment configured by the configuration manager 210. The debugging environment can be deployed to mimic a production environment that encountered a bug. In other examples, the distributed computing environment 214 may serve another purpose. Configuring the plurality of servers 212 in the distributed computing environment 214 automatically based on the updated configuration dataset 222 can, for example, allow a developer to use the distributed computing environment 214 as a debugging environment for determining where the bug occurred in the production environment.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processing device; and
a memory device including instructions that are executable by the processing device for causing the processing device to:
receive a configuration dataset;
identify a plurality of variables in the configuration dataset that have values that are undefined in the configuration dataset;
generate synthesized values for the plurality of variables, wherein a synthesized value for a variable of the plurality of variables is generated based on a type of the variable or contextual information associated with the variable in the configuration dataset;

generate an updated configuration dataset in which the plurality of variables are replaced with the synthesized values; and provide the updated configuration dataset to a configuration manager for causing the configuration manager to configure a plurality of servers in a distributed computing environment automatically based on the updated configuration dataset.

2. The system of claim 1, wherein the memory device further includes instructions that are executable by the processing device for causing the processing device to, for each respective variable in the plurality of variables:
determine a respective type of the respective variable; and
generate at least one synthesized value for the respective variable based on the respective type of the respective variable.

3. The system of claim 2, wherein the respective type is a string, character, integer, list, array, Boolean, or floating point number.

4. The system of claim 2, wherein the memory device further includes instructions that are executable by the processing device for causing the processing device to generate at least two synthesized values for the respective variable in response to determining that the respective type of the respective variable is a list or an array.

5. The system of claim 1, wherein the memory device further includes instructions that are executable by the processing device for causing the processing device to, for each respective variable in the plurality of variables:
identify, in the configuration dataset, respective contextual information associated with the respective variable; and
generate at least one synthesized value for the respective variable based on the respective contextual information associated with the respective variable.

6. The system of claim 1, wherein the configuration dataset is a first configuration dataset, and wherein the memory device further includes instructions that are executable by the processing device for causing the processing device to generate at least one synthesized value for at least one variable of the plurality of variables based on at least one defined value for the at least one variable in a second configuration dataset, the second configuration dataset being separate from the first configuration dataset.

7. The system of claim 1, wherein the memory device further includes instructions that are executable by the processing device for causing the processing device to generate at least one synthesized value for at least one variable of the plurality of variables based on at least one description of the at least one variable in at least one piece of documentation associated with the configuration manager.

8. The system of claim 1, wherein the memory device further includes instructions that are executable by the processing device for causing the processing device to:
identify a set of variables in the configuration dataset that have undefined values in the configuration dataset and for which the processing device is not to generate corresponding synthesized values when creating the updated configuration dataset; and
notify a user of the set of variables for enabling the user to manually input corresponding values for the set of variables into the updated configuration dataset prior to the updated configuration dataset being provided to the configuration manager.

9. The system of claim 8, wherein the memory device further includes instructions that are executable by the processing device for causing the processing device to notify the user of the set of variables prior to the updated configuration dataset being provided to the configuration manager by:
generating a report indicating the set of variables subsequent to creating the updated configuration dataset; and
outputting the report to the user.

10. The system of claim 1, wherein the configuration manager is Ansible and the configuration dataset is an Ansible playbook.

11. A method comprising:
receiving, by a computing device, a configuration dataset;
identifying, by the computing device, a plurality of variables in the configuration dataset that have values that are undefined in the configuration dataset;
generating, by the computing device, synthesized values for the plurality of variables, wherein a synthesized value for a variable of the plurality of variables is generated based on a type of the variable or contextual information associated with the variable in the configuration dataset;
generating, by the computing device, an updated configuration dataset in which the plurality of variables are replaced with the synthesized values; and
providing, by the computing device, the updated configuration dataset to a configuration manager for causing the configuration manager to configure a plurality of servers in a distributed computing environment automatically based on the updated configuration dataset.

12. The method of claim 11, further comprising, for each respective variable in the plurality of variables:
determining a respective type of the respective variable; and
generating at least one synthesized value for the respective variable based on the respective type of the respective variable.

13. The method of claim 12, wherein the respective type is a string, character, integer, list, array, Boolean, or floating point number.

14. The method of claim 12, further comprising generating at least two synthesized values for the respective variable in response to determining that the respective type of the respective variable is a list or an array.

15. The method of claim 11, further comprising, for each respective variable in the plurality of variables:
identifying, in the configuration dataset, respective contextual information associated with the respective variable; and
generating at least one synthesized value for the respective variable based on the respective contextual information associated with the respective variable.

16. The method of claim 11, wherein the configuration dataset is a first configuration dataset, and the method further comprises generating at least one synthesized value for at least one variable of the plurality of variables based on at least one defined value for the at least one variable in a second configuration dataset, the second configuration dataset being separate from the first configuration dataset.

17. The method of claim 11, further comprising generating at least one synthesized value for at least one variable of the plurality of variables based on at least one description of the at least one variable in at least one piece of documentation associated with the configuration manager.

18. The method of claim 11, further comprising:
identifying a set of variables in the configuration dataset that have undefined values in the configuration dataset and for which corresponding synthesized values are not to be generated when creating the updated configuration dataset; and notifying a user of the set of variables for enabling the user to manually input corresponding values for the set of variables into the updated configuration dataset prior to the updated configuration dataset being provided to the configuration manager.

19. The method of claim 18, further comprising notifying the user of the set of variables prior to the updated configuration dataset being provided to the configuration manager by:

generating a report indicating the set of variables subsequent to creating the updated configuration dataset; and outputting the report to the user.

20. A non-transitory computer-readable medium comprising program code that is executable by a processor for causing the processor to:

receive a configuration dataset;

identify a plurality of variables in the configuration dataset that have values that are undefined in the configuration dataset;

generate synthesized values for the plurality of variables, wherein a synthesized value for a variable of the plurality of variables is generated based on a type of the variable or contextual information associated with the variable in the configuration dataset;

generate an updated configuration dataset in which the plurality of variables are replaced with the synthesized values; and provide the updated configuration dataset to a configuration manager for causing the configuration manager to configure a plurality of servers in a distributed computing environment automatically based on the updated configuration dataset.

* * * * *